United States Patent [19]

Moore et al.

[11] Patent Number: 5,507,231
[45] Date of Patent: Apr. 16, 1996

[54] SOLID FUEL LAUNCH VEHICLE DESTRUCTION SYSTEM AND METHOD

[75] Inventors: Steven E. Moore, Pleasant View; F. Lynn Duce, Brigham City, both of Utah

[73] Assignee: Thiokol Corporation, Ogden, Utah

[21] Appl. No.: 322,917

[22] Filed: Oct. 13, 1994

[51] Int. Cl.⁶ .................................. F42B 15/36; F02K 9/00
[52] U.S. Cl. ........................ 102/374; 102/377; 102/378; 60/253; 60/254
[58] Field of Search .................................. 102/374, 377, 102/378; 60/254, 253; 244/172

[56] References Cited

U.S. PATENT DOCUMENTS

| | | | |
|---|---|---|---|
| 3,205,821 | 9/1965 | Abescat et al. | 102/49 |
| 3,229,638 | 1/1966 | Wollston et al. | 102/49 |
| 3,487,644 | 1/1970 | Kyle | 60/254 |
| 3,726,215 | 4/1973 | Colpitts et al. | 102/24 R |
| 4,007,688 | 2/1977 | Franz | 102/374 |
| 4,057,442 | 11/1977 | Shaw et al. | 149/109.4 |
| 4,361,450 | 11/1982 | Munson | 149/19.91 |
| 4,404,911 | 9/1983 | Bell et al. | 102/221 |
| 4,557,198 | 12/1985 | Hickey | 102/481 |
| 4,649,824 | 3/1987 | Guay | 102/307 |
| 4,660,472 | 4/1987 | Stevens | 102/202.1 |
| 4,699,066 | 10/1987 | Eriksson | 102/305 |
| 4,716,830 | 1/1988 | Davis et al. | 102/248 |
| 4,766,726 | 8/1988 | Tackett et al. | 60/255 |
| 4,793,887 | 12/1988 | Card et al. | 156/307.3 |
| 4,793,888 | 12/1988 | Card et al. | 156/307.3 |
| 4,829,765 | 5/1989 | Bolieau et al. | 60/250 |
| 4,901,642 | 2/1990 | White et al. | 102/202 |
| 5,044,154 | 9/1991 | English, Jr. et al. | 60/223 |
| 5,060,470 | 10/1991 | VanName | 60/253 |
| 5,070,691 | 12/1991 | Smith et al. | 60/245 |
| 5,117,758 | 6/1992 | Renzi | 102/378 |
| 5,127,223 | 7/1992 | Hightower, Jr. et al. | 60/253 |
| 5,150,654 | 9/1992 | Grosgebauer et al. | 102/202 |
| 5,166,468 | 11/1992 | Atkeson | 102/207 |
| 5,206,989 | 5/1993 | Smith et al. | 29/890.01 |
| 5,228,285 | 7/1993 | Van Name et al. | 60/253 |
| 5,280,706 | 1/1994 | Yorgason | 60/255 |
| 5,337,672 | 8/1994 | Boissiere et al. | 102/481 |
| B14,394,329 | 9/1989 | Barnes | 558/484 |

*Primary Examiner*—Charles T. Jordan
*Assistant Examiner*—Theresa M. Wesson
*Attorney, Agent, or Firm*—Madson & Metcalf; Ronald L. Lyons

[57] ABSTRACT

A system and method for shattering a launch vehicle into relatively small pieces are described. The launch vehicle includes at least one solid fuel rocket motor having a propellant disposed about a combustion chamber within a rocket motor case. Each rocket motor also includes at least one motor igniter to ignite the propellant and at least one explosive charge adjacent the rocket motor case. A firing unit is capable of generating a motor ignition signal and a charge explosion signal. A first propagator carries the motor ignition signal to the motor igniter so the signal arrives after a propagation time $T_{ignition}$ and causes ignition of the previously unignited rocket motor. A second propagator carries the charge explosion signal to the explosive charge so the signal arrives after a propagation time $T_{explosion}$ and causes an explosion against the rocket motor case. The time $T_{explosion}$ is greater than the time $T_{ignition}$ by a pressurization time $T_{pressurization}$ that is sufficient to allow pressurization of the combustion chamber before actuation of the explosive charge. Pressurization of the combustion chamber exerts forces on the rocket motor case which act in combination with the subsequent force from the explosion to shatter both the case and the propellant much more effectively than conventional destruction systems.

23 Claims, 7 Drawing Sheets

SOLID FUEL LAUNCH VEHICLE DESTRUCTION SYSTEM AND METHOD

FIELD OF THE INVENTION

The present invention relates to a system and method for shattering a launch vehicle during flight, and more particularly to a system and method which utilize a combination of forces created by first pressurizing a rocket motor and then exploding charges against the rocket motor's case to shatter the case and the propellant into pieces that are substantially smaller than the intact rocket motor.

TECHNICAL BACKGROUND OF THE INVENTION

In spite of careful planning and proper attention to the appropriate precautions, launch vehicles occasionally stray from their desired flight path. Often this errant behavior, although undesirable, poses no danger to the general population. However, in some cases the errant path leads off the test range toward populated areas. Thus, it may become necessary to destroy a launch vehicle in flight to prevent it from reaching a populated area. Launch vehicles which are capable of receiving and acting upon a command to "self-destruct" are widely known in the art.

However, those of skill in the art recognize that self-destruction may be directed toward different goals. At a minimum, self-destruction has the goal of rendering the launch vehicle non-propulsive. A more ambitious goal is to somehow prevent the non-propulsive launch vehicle from reaching populated areas.

The conventional means used to render a rocket motor non-propulsive depends in part on whether the rocket motor is powered by liquid fuel or by solid fuel. In vehicles that are propelled by one or more liquid fuel rocket motors, the liquid fuel is transported from storage tanks through pipes to a combustion chamber. The pipes include valves for controlling the flow of fuel. Such a launch vehicle can therefore be rendered non-propulsive by simply closing the valves to shut off the supply of fuel. Without fuel supplied to the combustion chamber, the currently ignited stage will cease combustion and become non-propulsive. Ensuring closure of the appropriate valves will likewise render non-propulsive all as yet unignited liquid fuel stages of a multi-stage liquid fuel rocket motor.

Unfortunately, it is generally not possible to render a solid fuel rocket motor non-propulsive by shutting off the fuel supply. In a solid fuel rocket motor the solid fuel is typically formed into a cylindrical or bottle-shaped mass that surrounds and substantially defines the combustion chamber. Thus, there is no valve separating the fuel supply from the combustion chamber such that closing the valve will shut off the fuel supply. Once a mass of solid fuel is ignited, it typically burns continuously until substantially all of the fuel is consumed.

In order to render an ignited solid fuel rocket motor stage non-propulsive, it is therefore conventional to fracture the case with an explosive charge. The case is typically fractured by exploding a linear shaped charge that is positioned adjacent the motor case. The fractured case is unable to resist the combustion pressures created by the operating motor. As a result, a crack is created in the case and the propellant. Combustion products then travel through the crack to the ambient environment instead of taking the normal path through the rocket motor's nozzle. As a result, the combustion chamber loses pressure and the ignited stage is rendered non-propulsive.

Nothing need be done to unignited solid fuel stages to render them non-propulsive; unless their propellant is ignited, they will remain non-propulsive. However, as a precaution against inadvertent ignition, the case of each unignited upper stage in a multi-stage solid fuel launch vehicle is generally fractured when the launch vehicle is ordered to self-destruct. An explosive charge is typically exploded against each unignited stage's motor case to fracture each case sufficiently to prevent normal pressurization of the motor.

The force of the explosion often does not fracture the propellant within the case sufficiently to create a crack that connects the combustion chamber with the ambient environment. Instead, the explosion merely weakens a region of the case by fracturing that case region, and weakens the adjacent region of the propellant by denying that propellant region the structural support that would be provided by an intact case. Thus, if an upper stage is inadvertently ignited during the self-destruction, the weakened regions of the case and propellant will give way, a crack will open, and the stage will be rendered non-propulsive because it is unable to pressurize normally.

If the launch vehicle is sufficiently far from populated areas when the self-destruct command is received and the currently ignited motor is rendered non-propulsive, the vehicle will fall out of flight before it poses any danger to the populace. However, on rare occasions the launch vehicle may have already attained sufficient height and momentum to reach a populated area even though the vehicle is no longer being propelled by a rocket motor. Simply rendering the vehicle non-propulsive is not sufficient if the vehicle is close enough for non-propulsive, but substantially intact, stages to reach the populated area. Impact of the launch vehicle or parts thereof in the populated area may cause extensive damage, injuries, or even fatalities.

A major concern is the size of the non-propulsive launch vehicle parts. When fractured or cracked by conventional destruction systems, the upper stages of multi-stage solid fuel rocket motors typically remain in substantially one piece. Indeed, several fractured but substantially intact stages may remain secured to one another after "destruction" of the launch vehicle. Many ballistic missiles and new generation launch vehicles include at least two solid fuel stages, with a single stage sometimes weighing well over 100,000 pounds. Thus, even if a multi-stage solid fuel rocket motor is split into separate stages, and even if the ignited stage is rendered non-propulsive, and even if the cases of the unignited upper stages are fractured, conventional approaches may still allow extremely large pieces of explosive debris to fall upon a populated area.

Thus, it would be an advancement in the art to provide a system and method for shattering a previously unignited solid fuel rocket motor into many smaller pieces.

It would also be an advancement to provide a system and method which assist in shattering a launch vehicle that is attached to the solid fuel rocket motor.

Such a system and method are disclosed and claimed herein.

BRIEF SUMMARY OF THE INVENTION

The present invention provides a system for shattering a launch vehicle into relatively small pieces. The launch vehicle includes a controller capable of generating a destruct signal. The controller may generate the destruct signal in response to an order received at the launch vehicle from an external source, such as an authority at the location from which the vehicle was launched. Alternatively, the controller may generate the destruct signal solely in response to alarms raised by diagnostic or control systems on board the vehicle.

The launch vehicle includes at least one solid fuel rocket motor. Each solid fuel rocket motor includes a solid fuel propellant disposed about a combustion chamber within a rocket motor case. The propellant and the case are formed by methods and with materials that are well-known in the art. Each rocket motor also includes at least one motor initiator positioned adjacent a motor igniter to ignite the propellant during flight of the launch vehicle. Although they have not been previously configured according to the present invention, motor igniters and motor initiators are well known in the art.

At least one explosive charge is positioned adjacent the rocket motor case. The explosive charge may be a conventional destruction vent charge, such as a linear shaped charge. Alternatively, a grid of explosive charges may be positioned adjacent the motor case. According to the teachings of the present invention, the explosive charge is configured and employed not merely to pierce the case and propellant, but to assist in shattering the case and propellant into many smaller pieces. Suitable explosive compounds are known to those of skill in the art.

A preferred embodiment of the system of the present invention includes at least one firing unit. Each firing unit is capable of receiving the destruct signal from the controller and of generating in response a motor ignition signal and a charge explosion signal. Diagnostic subunits within each firing unit are also capable of generating a destruct signal in response to unplanned stage separation or other predetermined conditions. Those of skill in the art may readily construct such a firing unit with the aid of the teachings set forth herein.

The system also includes a motor ignition signal propagator having a motor ignition signal input and a motor ignition signal output. The motor ignition signal input is connected in signal communication with the firing unit for receiving the motor ignition signal from the firing unit. The motor ignition signal propagator propagates the motor ignition signal such that the motor ignition signal arrives at the motor ignition signal output a motor ignition signal propagation time $T_{ignition}$ after the destruct signal reaches the firing unit.

The motor ignition signal output is configured to cause ignition of the previously unignited solid fuel rocket motor in response to the arrival of the motor ignition signal. To accomplish ignition when the launch vehicle strays, the motor ignition signal output may actuate a normal motor initiator, namely, a motor initiator that is configured to initiate ignition of the propellant during normal flight of the launch vehicle along a desired flight path. However, it is presently preferred that the system include a separate destruction motor initiator. The destruction motor initiator initiates ignition of the propellant in response to the motor ignition signal if the launch vehicle strays substantially from the desired flight path. A destruction motor initiator which is separate from the normal motor initiator is preferred to preserve the integrity and reliability of the normal motor ignition train.

In addition to the ignition propagator, the system includes a charge explosion signal propagator having a charge explosion signal input and a charge explosion signal output. The charge explosion signal input is connected in signal communication with the firing unit for receiving the charge explosion signal from the firing unit. The charge explosion signal propagator is capable of propagation of the charge explosion signal such that the charge explosion signal arrives at the charge explosion signal output a charge explosion signal propagation time $T_{explosion}$ after the destruct signal reaches the firing unit. The charge explosion signal output is configured to cause actuation of the explosive charge in response to the arrival of the charge explosion signal.

The charge explosion signal propagation time $T_{explosion}$ is greater than the motor ignition signal propagation time $T_{ignition}$ by a pressurization time $T_{pressurization}$. The pressurization time $T_{pressurization}$ is sufficient to allow ignition of the propellant and consequent pressurization of the combustion chamber in response to the motor ignition signal before actuation of the explosive charge in response to the charge explosion signal. Pressurization of the combustion chamber exerts forces on the rocket motor case which act in combination with the subsequent force from explosion of the charge to shatter both the case and the propellant much more effectively than the explosion charge alone or than conventional explosive charges.

To provide a suitable pressurization time $T_{pressurization}$, the explosion propagator may include a delay unit. The delay unit may include mechanical, electronic, and/or pyrotechnical components. If the explosion propagator carries an electronic charge explosion signal, then the delay unit preferably includes a conventional electronic delay unit. If the explosion propagator carries a pyrotechnic charge explosion signal, the delay unit is preferably a conventional ordnance delay unit.

The present invention also provides a method for destroying a launch vehicle. The launch vehicle includes at least one unignited solid fuel rocket motor. The solid fuel rocket motor may be a second or later stage of a multi-stage rocket motor, or it may be a single stage solid fuel rocket motor secured to a launch vehicle that is also propelled by means other than solid fuel rocket motors. Each rocket motor includes a solid fuel propellant disposed about a combustion chamber within a rocket motor case. Each rocket motor also includes at least one explosive charge positioned adjacent the rocket motor case.

A presently preferred method includes at least three steps, namely, an igniting step, a pressurizing step, and a shattering step. During the igniting step, the previously unignited propellant of the rocket motor is ignited. The stages of the rocket may be separated before this ignition occurs, or the stages may be ignited without prior stage separation.

The igniting step causes the subsequent pressurization of the combustion chamber of the rocket motor by placing within the chamber combustion products of the ignited propellant. However, pressurization is not accomplished immediately. A pressurization time $T_{pressurization}$ which depends on the particular rocket motor in question must elapse before the pressurizing step is complete. The pressurization places the rocket motor propellant and case under tension.

The shattering step begins by exploding the explosive charge. The explosive charge is configured as described above to act in concert with the stresses created by combustion chamber pressurization to destroy the rocket motor by shattering it into many smaller pieces. Unlike conventional explosions that merely pierce or cut a rocket motor case and typically leave the propellant in one piece, the shattering explosion, coupled with a pressurized combustion chamber, shatters the rocket motor case and propellant into many smaller pieces.

In summary, the present invention provides a system and method for shattering a solid fuel rocket motor into many pieces that are substantially smaller than the original rocket motor by subjecting the rocket motor case and propellant to the combined forces of motor pressurization and charge explosion. The rocket motor is first stressed from inside by pressurization of the combustion chamber. The rocket motor case is then subjected to explosive forces from at least one explosive charge. As a result, the motor shatters into many smaller pieces, thereby greatly reducing the risk to populated areas. The forces acting on the motor, and those created by the flying pieces of the shattered motor, also tend to break the entire launch vehicle into smaller pieces.

These and other features and advantages of the present invention will become more fully apparent through the following description and appended claims taken in conjunction with the accompanying drawings.

BRIEF DESCRIPTION OF THE DRAWINGS

In order to illustrate the manner in which the above-recited and other advantages and features of the invention are obtained, a more particular description of the invention summarized above will be rendered by reference to the appended drawings. Understanding that these drawings only provide a selected embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the figures wherein like parts are referred to by like numerals. The present invention relates to a system for shattering a launch vehicle such as the vehicle indicated generally at 10. Although a particular launch vehicle is shown in FIG. 1, the launch vehicle used with the present invention may be a ballistic missile, an air-to-air missile, a rocket, a torpedo, a reusable aerospace vehicle, or any other vehicle capable of being launched into flight in the air, in space, or under the sea.

The launch vehicle 10 is propelled solely by several solid fuel rocket motors 12. Other launch vehicles used with the present invention may be configured with other propulsive means such as liquid fuel or hybrid rocket motors (not shown), provided that they also include at least one solid fuel rocket motor. Each solid fuel rocket motor 12 includes a solid fuel propellant 14 disposed about a combustion chamber 16 within a rocket motor case 18. The propellant 14 and the case 18 are formed according to methods well-known in the art.

Figure 1:
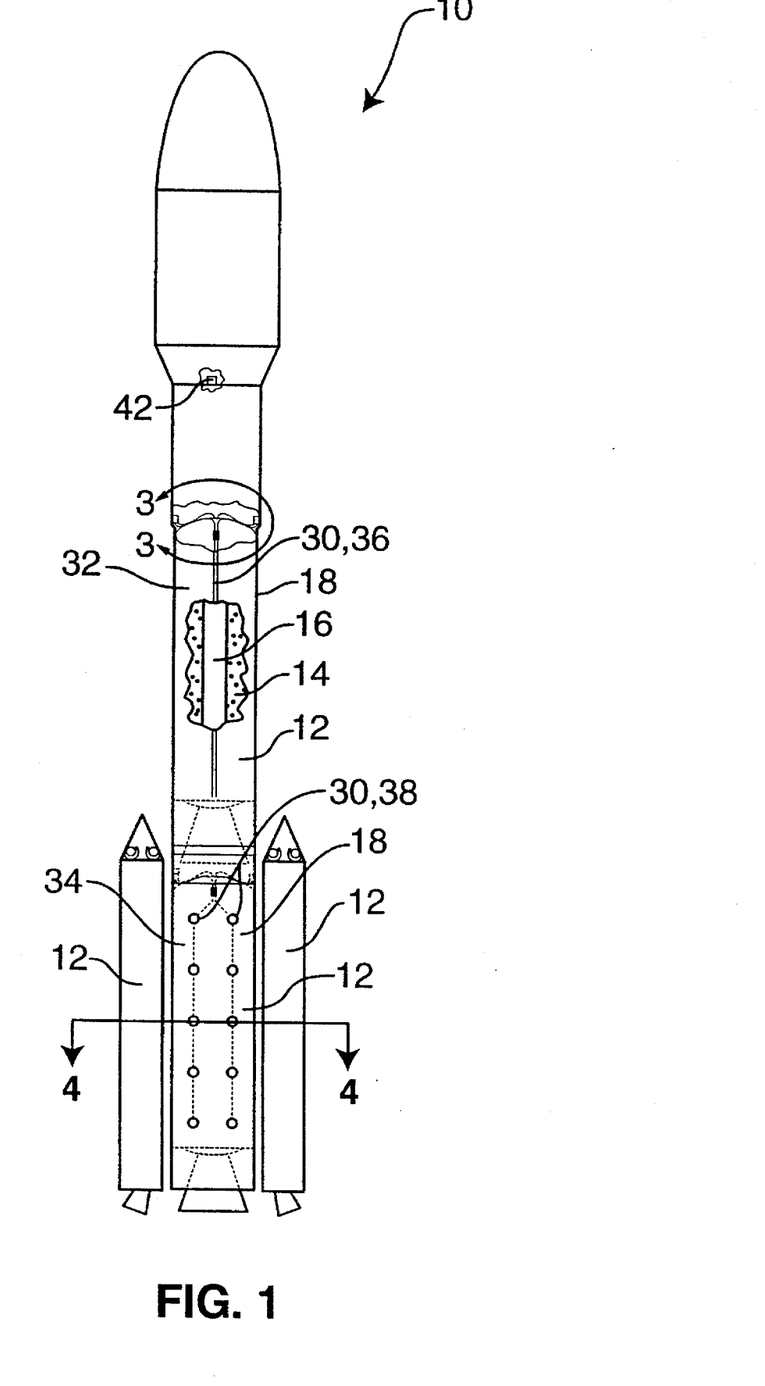
FIG. 1 is a partial cut-away side elevation illustrating solid fuel rocket motors of a launch vehicle that is equipped with a system for shattering the launch vehicle's rocket motor cases and propellant masses according to the present invention.
Figure 2:
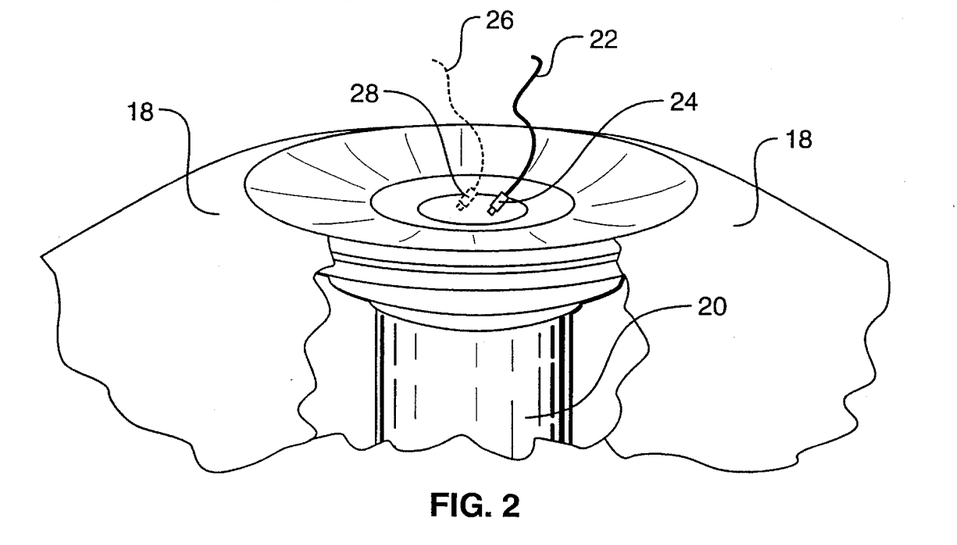
FIG. 2 is a partial cut-away perspective view illustrating a motor igniter positioned in the upper stage rocket motor case, showing a line leading to a through-bulkhead-initiator for use in both normal and destruction ignition, and also showing a redundant line and initiator in phantom.

With reference to FIGS. 1 and 2, each rocket motor 12 also includes at least one motor igniter 20 adjacent the propellant 14. The motor igniter 20 is capable of igniting the propellant 14 during flight of the launch vehicle 10. At least one ignition line 22 leads to a through-bulkhead-initiator 24 positioned adjacent the motor igniter 20 and capable of actuating the igniter 20.

In alternative embodiments at least one redundant ignition line 26 (shown in phantom in FIG. 2) leads to a corresponding redundant through-bulkhead-initiator 28 (also shown in phantom) adjacent the motor igniter 20. The lines 22, 26 and the initiators 24, 28 form part of the normal motor ignition train. The lines 22, 26 and the initiators 24, 28 also form part of the destruction ignition train unless separate lines and initiators are provided as described hereafter.

With reference to FIG. 1, at least one explosive charge 30 is positioned adjacent each rocket motor case 18. For purposes of illustration, FIG. 1 shows an upper stage rocket motor 32 and a lower stage rocket motor 34 configured differently with explosive charges 36 and 38, respectively. The upper stage explosive charge 36 includes a conventional destruction vent charge in the form of one or more linear shaped charge assemblies 40 as shown in FIG. 3.

Figure 4:
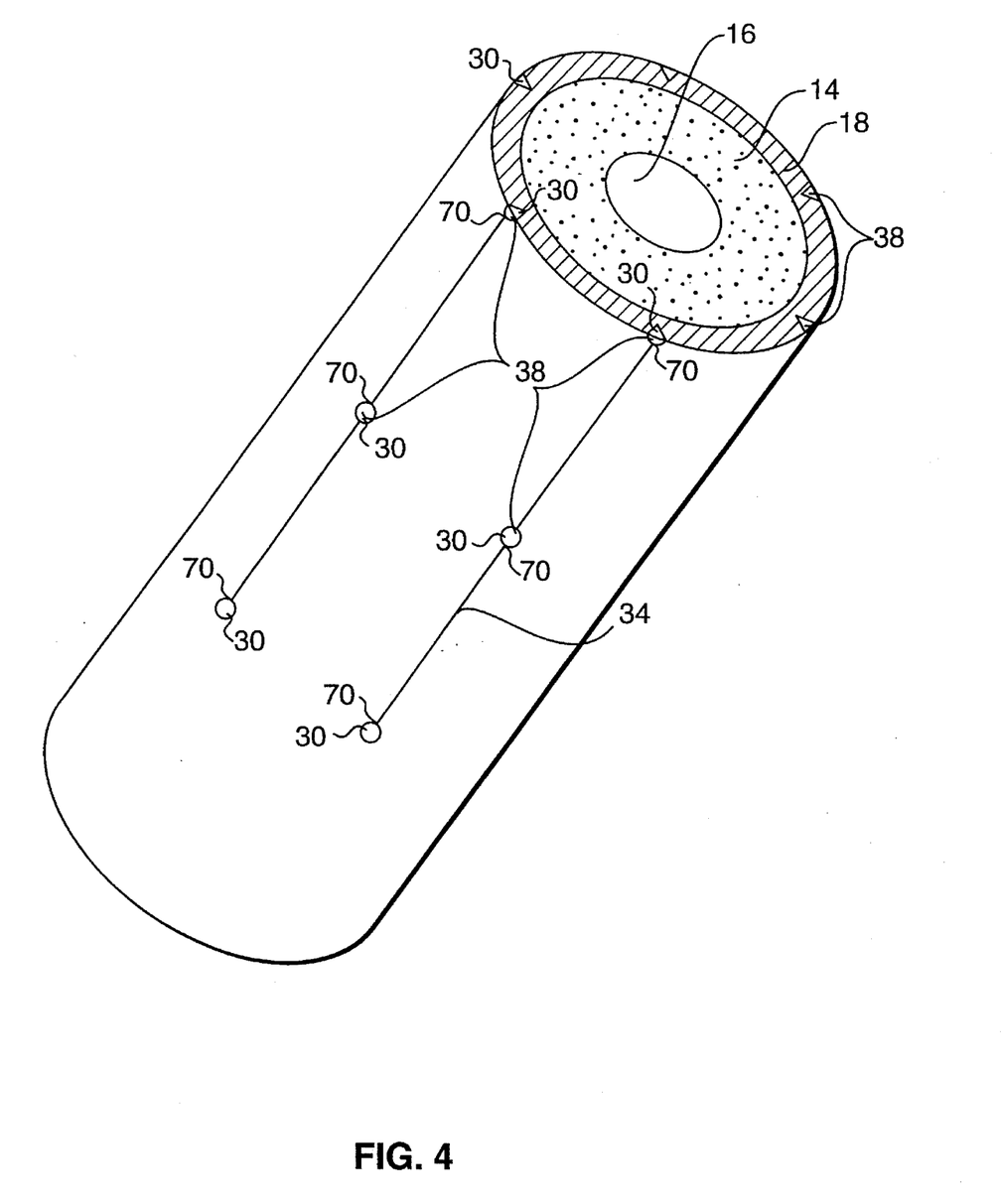
FIG. 4 is a perspective transverse cross-sectional view of the lower stage rocket motor shown in FIG. 1, further illustrating a grid of conical explosive charges secured to the rocket motor case.

The lower stage explosive charge 38, shown best in FIG. 4, includes a grid of explosive charges. A grid of conical charges 38 is illustrated, but those of skill will appreciate that a variety of other explosive shapes may also be employed according to the teachings herein. The charges 38 may be configured for either simultaneous or sequential actuation. Suitable explosive charges 30 include aluminum- or copper-sheathed charges, including linear or other shaped charges, containing a suitable high explosive material (e.g., HMX or RDX) sized and configured to reliably shatter the pressurized case 18.

Figure 3:
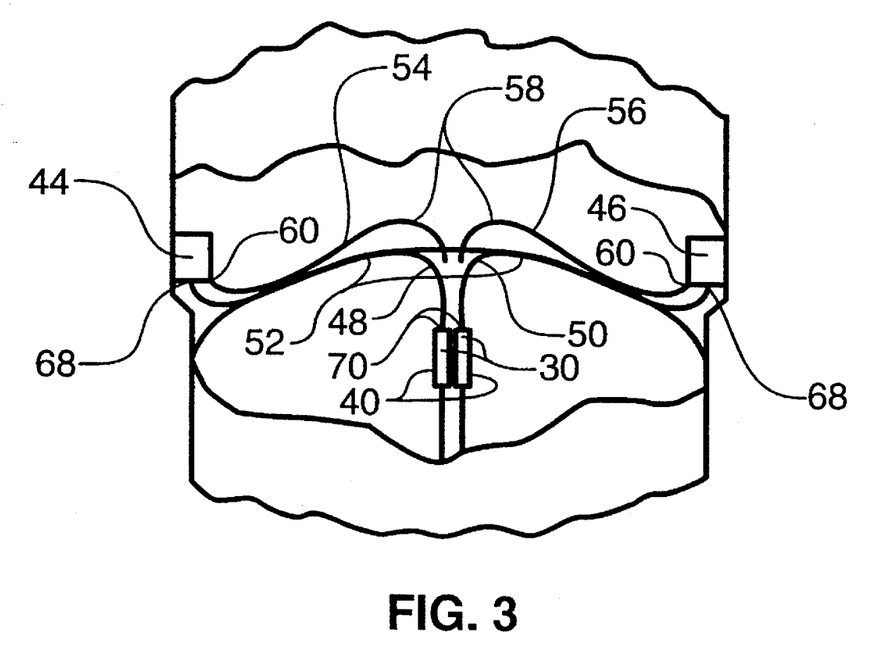
FIG. 3 is an enlargement of the indicated portion of FIG. 1, illustrating a motor ignition signal propagator, a charge explosion signal propagator, and a pair of linear explosive charges secured to the upper stage rocket motor case.

With reference to FIG. 3, the launch vehicle 10 (FIG. 1) includes at least one controller 42. The controller 42 may comprise a conventional command destruct receiver connected to an antenna for receiving a destruct order from a remote radio transmitter (not shown). The controller 42 preferably comprises a subunit capable of decrypting and validating the destruct order. The controller 42 is capable of generating a destruct signal in response to a valid order received at the launch vehicle 10 from an external source such as an authority (not shown) at the location from which the vehicle 10 was launched. The destruct signal is transmitted to at least one firing unit 44, and preferably to a firing unit 44 on each of the rocket motors 12. Unless otherwise expressly indicated herein, it is understood that the firing units 44 (FIG. 3), 45 (FIG. 8), and 46 (FIG. 3) function in the same manner as one another, and that a reference to a particular firing unit also applies to the other firing units described herein.

Alternatively, the controller 42 or the firing unit 44 may generate the destruct signal solely in response to alarms raised by diagnostic or control systems on board the vehicle 10. For instance, a diagnostic subunit of a firing unit 44 on each of the rocket motors 12 preferably generates a destruct signal in response to undesired separation of one or more rocket motors 12 from the vehicle 10. Appropriate controllers and diagnostic systems are well known and understood in the art.

Thus, each firing unit 44 is capable of receiving the destruct signal from the controller 42 or of generating the destruct signal in response to firing unit diagnostics, and of generating in response to the destruct signal a motor ignition signal and a charge explosion signal. To enhance reliability, each rocket motor 12 is preferably also configured with a redundant firing unit 46 which is likewise capable of generating a motor ignition signal and a charge explosion signal in response to a destruct signal.

Each firing unit 44, 46 is connected to at least one explosive charge 30 by a portion 48, 50, respectively, of a charge explosion signal propagator 52. The portions 48, 50 may include wires to carry electronic signals, pyrotechnic transmission lines to carry pyrotechnic signals, some other signal propagation means, or a mixture of signal propagation means. Each firing unit 44, 46 is also preferably connected to the motor initiator 20 (FIG. 5) by an ignition line 54, 56, respectively. The ignition lines 54, 56 are part of a motor ignition signal propagator 58.

As used herein, the term "signal" comprises both electronic signals and pyrotechnic signals unless otherwise indicated. Thus, an electronic impulse traveling along a wire is a signal. A region of ignition traveling along a fuse, an ordnance delay, or another type of pyrotechnic transmission line is likewise a signal. Other types of signals which require no transmission medium, including optical signals, microwave signals, and radio frequency signals, also lie within the scope of the term "signal" as used herein. Accordingly, although particular embodiments of the signal propagators 52 and 58 may employ pyrotechnic transmission lines and wires, those of skill in the art will appreciate that other embodiments of the propagators 52, 58 also lie within the scope of the present invention.

Figure 5:
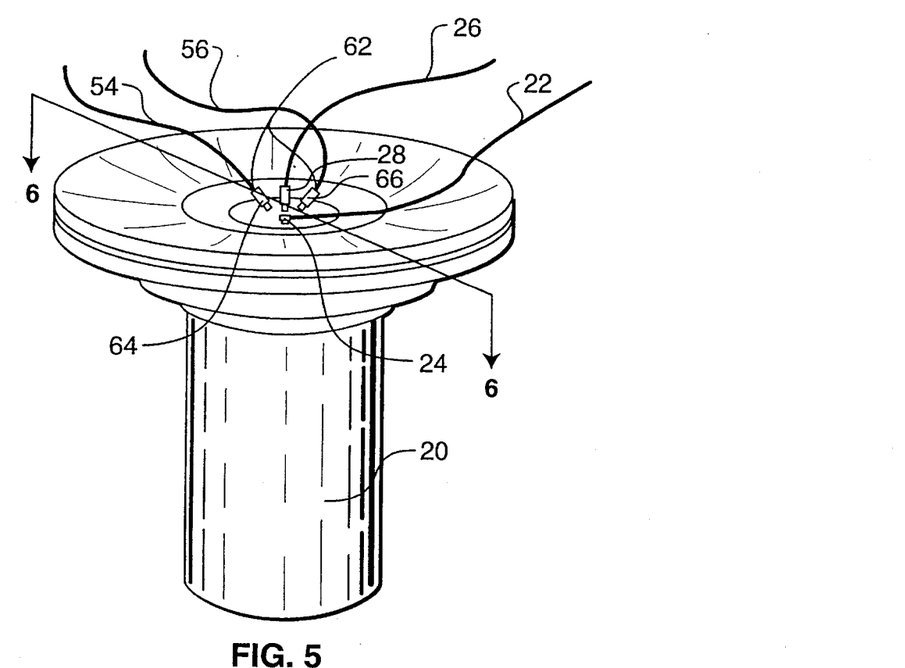
FIG. 5 is a perspective view illustrating an alternative embodiment in which two lines lead to through-bulkhead-initiators for use in normal ignition and two additional lines lead to separate through-bulkhead-initiators for use in destruction ignition of a motor igniter.

With reference to FIGS. 3 and 5, the motor ignition signal propagator 58 has a motor ignition signal input 60 and a motor ignition signal output 62. As used herein, "input" and "output" each include one or more spatially separated points near the beginning and ending, respectively, of a signal transmission path. The motor ignition signal input 60 is connected in signal communication with at least one firing unit such as the firing unit 44 for receiving the motor ignition signal from the firing unit 44. The motor ignition signal propagator 58 is capable of propagation of the motor ignition signal such that the motor ignition signal arrives at the motor ignition signal output 62 a motor ignition signal propagation time $T_{ignition}$ after the destruct signal reaches the firing unit 44.

Figure 6:
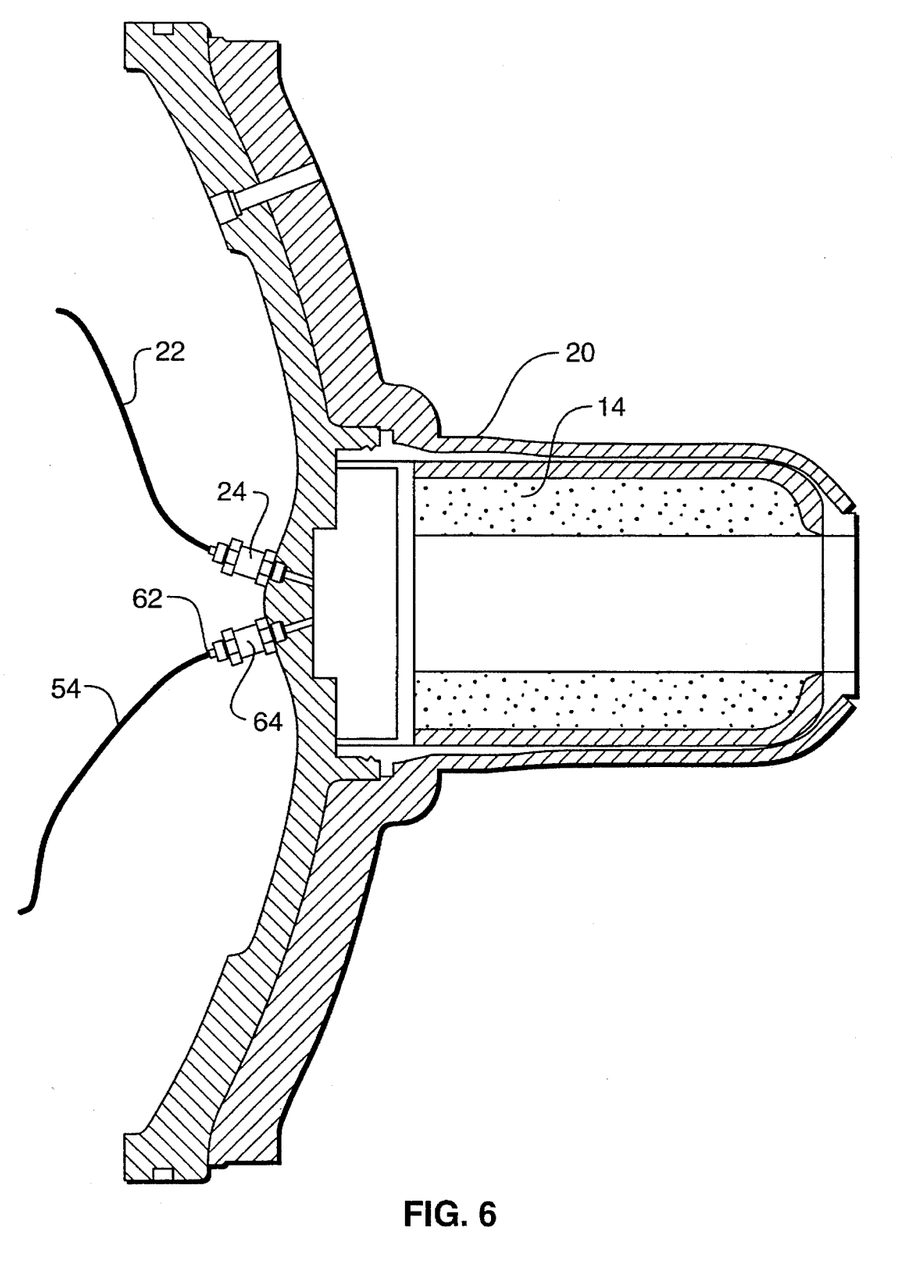
FIG. 6 is a longitudinal cross-section taken along line 6—6 of FIG. 5.

As shown in FIGS. 5 and 6, the motor ignition signal output 62 is configured in communication with additional through-bulkhead-initiators 64, 66 to cause ignition of the previously unignited propellant 14 in the solid fuel rocket motor 12 (FIG. 1) in response to the arrival of the motor ignition signal. Thus, in contrast with the conventional approach which attempts to guard against ignition of unignited upper stages of a solid fuel launch vehicle during self-destruction, the present invention intentionally initiates ignition of at least one upper stage 32. Indeed, it is preferred that every unignited upper stage and every other unignited solid fuel stage of the launch vehicle 10 be ignited.

To accomplish ignition, the motor ignition signal output 62 may be connected to the normal motor initiators 24, 28. However, it is presently preferred that the system include at least one destruction motor initiator 64, and most preferably also include a redundant destruction motor initiator 66, as illustrated in FIG. 5. The destruction motor initiators 64, 66 are secured to the rocket motor 12 (FIG. 1) in signal communication with the motor ignition signal output 62 adjacent the motor igniter 20 as part of a destruction ignition train. Thus configured, either or both destruction motor initiators 64, 66 are capable of initiating ignition of the propellant 14 in response to the motor ignition signal if the launch vehicle 10 (FIG. 1) strays substantially from the desired flight path. Using separate destruction motor initiators 64, 66 is preferred to preserve the integrity and reliability of the normal motor ignition train.

With reference now to FIGS. 1, 3, and 4, the charge explosion signal propagator 52 has a charge explosion signal input 68 and a charge explosion signal output 70. The charge explosion signal input 68 is connected in signal communication with at least one of the firing units 44, 46 on the rocket motor 12 for receiving the charge explosion signal. The charge explosion signal propagator 52 is capable of propagation of the charge explosion signal such that the charge explosion signal arrives at the charge explosion signal output 70 a charge explosion signal propagation time $T_{explosion}$ after the destruct signal reaches the firing unit 44. The charge explosion signal output 70 is configured in conventional manner to cause actuation of the explosive charge 30 in response to the arrival of the charge explosion signal.

The charge explosion signal propagation time $T_{explosion}$ is greater than the motor ignition signal propagation time $T_{ignition}$ by a pressurization time $T_{pressurization}$ which is sufficient to allow ignition of the propellant 14 and consequent pressurization of the combustion chamber 16 in response to the motor ignition signal before actuation of the explosive charge 30 in response to the charge explosion signal. In a typical motor such as the CASTOR solid fuel motor manufactured by Thiokol Corp. of Ogden, Utah, a pressurization time $T_{pressurization}$ in the range from about 100 milliseconds to about 1000 milliseconds is suitable, and a pressurization time $T_{pressurization}$ in the range from about 200 milliseconds to about 400 milliseconds is preferred. CASTOR is a trademark of Thiokol Corporation.

Pressurization of the combustion chamber 16 exerts forces on the rocket motor case 18 which act in combination with the subsequent force from explosion of the charge 30 to shatter both the case 18 and the propellant 14. These combined forces are particularly effective on composite rocket motor cases 18, but the present invention is also suitable for use with rocket motor cases 18 formed of steel or other materials.

Figure 7:
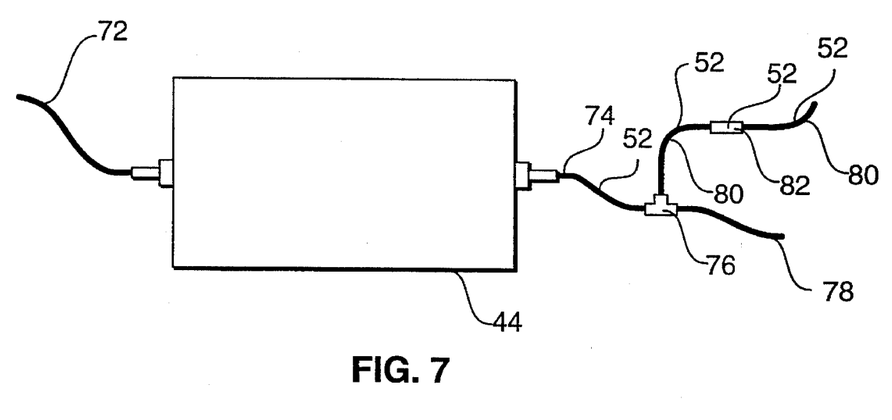
FIG. 7 is a schematic diagram illustrating a firing unit having a single pyrotechnic signal output which is replicated by an ordnance T to allow propagation of a motor ignition signal along a first line and delayed propagation of a charge explosion signal along a second line.
Figure 8:
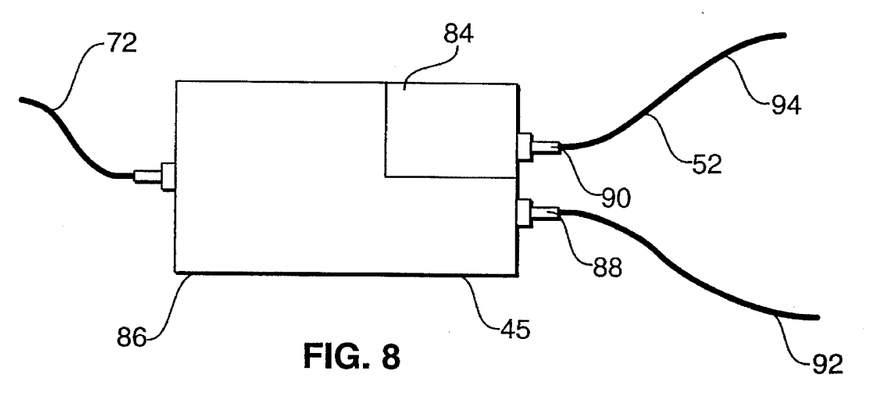
FIG. 8 is a schematic diagram illustrating a firing unit having a first electronic signal output to allow propagation of a motor ignition signal along a first line and having an incorporated electronic delay unit and a second electronic signal output to allow delayed propagation of a charge explosion signal along a second line.

With reference to FIGS. 3, 7, and 8, the firing unit 44 and the propagators 52, 58 may be configured in various alternative embodiments. Two embodiments are shown in FIGS. 7 and 8. FIG. 7 illustrates an existing technology firing unit 44 adapted for use according to the teachings herein. The firing unit 44 is configured to receive a destruct signal from a controller 42 (FIG. 3) along a wire 72. The firing unit 44 is in signal communication with a pyrotechnic transmission line 74. In a conventional destruction system, the line 74 would lead only to a motor igniter 20 (FIG. 2).

In a system according to the present invention, however, the line 74 leads to a fork or "T" 76. The T 76 may be a conventional ordnance T. The T 76 transmits a pyrotechnic signal from the line 74 as two signals along two lines 78, 80. The line 78 leads to a motor igniter 20. The line 54 or the line 56 in FIG. 5 may be embodied as the line 78. The lines 78, 54, and 56 each carry a motor ignition signal and form part of the motor ignition signal propagator 58 described herein.

The line 80 leads up to, and then away from, a delay unit 82. The line 48 or the line 50 in FIG. 3 may be embodied as the line 80. The lines 48, 50, and 80 each carry a charge explosion signal and form part of the charge explosion signal propagator 52. The delay unit 82, which is also part of the explosion propagator 52, may in general include mechanical, electronic, and/or pyrotechnical components. As the explosion propagator 52 in the embodiment shown in FIG. 7 carries a pyrotechnic charge explosion signal, the delay unit 82 in that embodiment is preferably a conventional ordnance delay.

The embodiment of the explosion propagator 52 in FIG. 8 carries an electronic charge explosion signal. Thus, a delay unit 84 comprising conventional electronic delay unit circuitry is preferably employed. The electronic delay unit 84 is preferably housed in the same housing 86 as the circuitry of a firing unit 45 which provides two separate electronic outputs 88, 90. The output 88 provides an electronic motor ignition signal to an ignition wire 92. The line 54 or the line 56 in FIG. 5 may be embodied as the ignition wire 92. The output 90 provides an electronic charge explosion signal, after a suitable pressurization time delay $T_{pressurization}$ caused by the delay unit 84, to a charge explosion wire 94. The line 48 or the line 50 in FIG. 3 may be embodied as the charge explosion wire 94.

Figure 9:
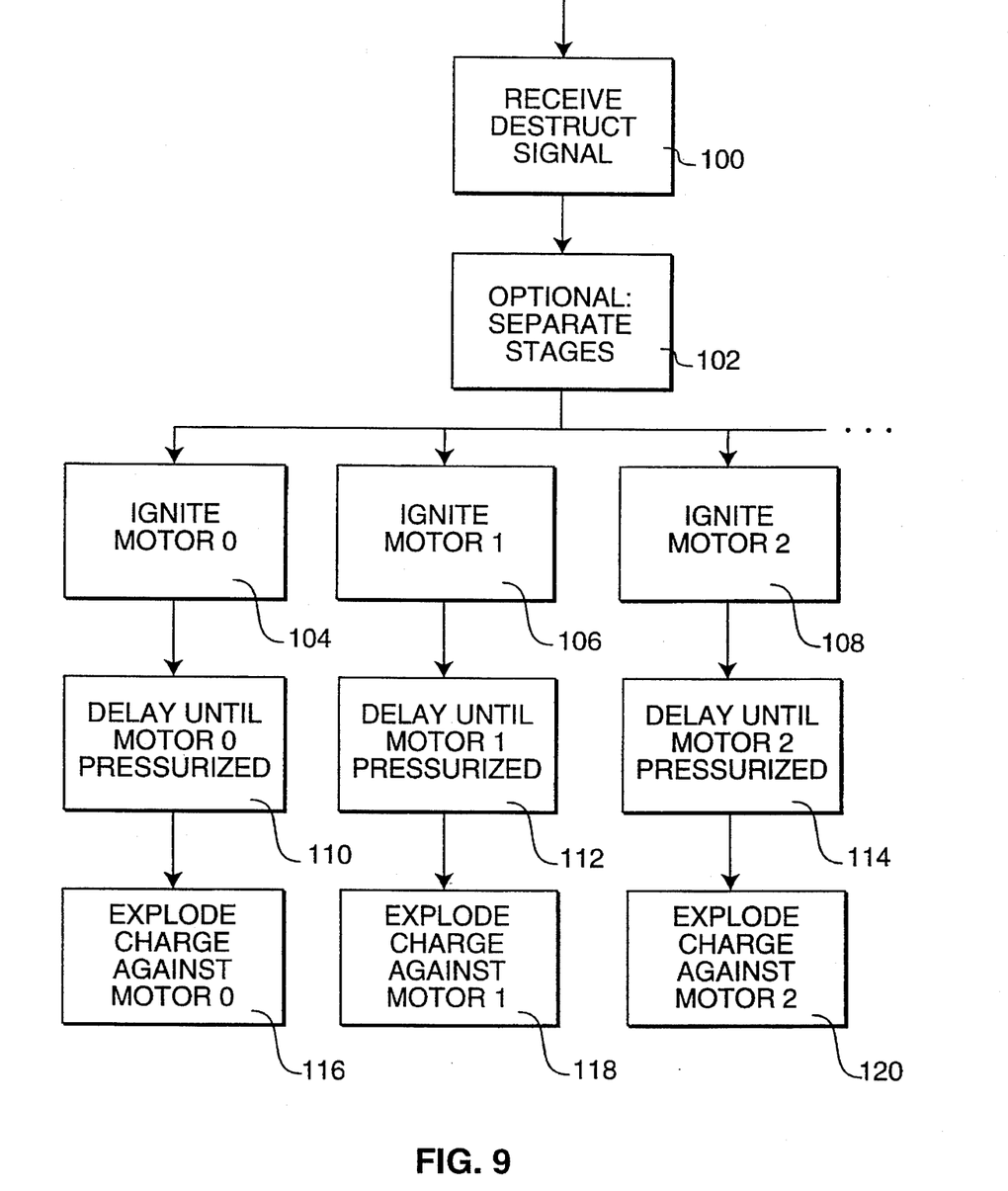
FIG. 9 is a flowchart illustrating possible steps in a method for shattering a launch vehicle according to the present invention.

With reference to FIG. 9, the present invention also provides a method for destroying a launch vehicle. The launch vehicle includes at least one unignited solid fuel rocket motor. The solid fuel rocket motor may be a second or later stage of a multi-stage rocket motor, or it may be a single stage solid fuel rocket motor secured to a launch vehicle that is also propelled by means other than solid fuel rocket motors. Each rocket motor includes a solid fuel propellant disposed about a combustion chamber within a rocket motor case. Each rocket motor also includes at least one explosive charge, positioned adjacent the rocket motor case.

Initially, a destruct signal is received at each rocket motor as indicated at 100 in FIG. 9. It is understood that the destruct signal may be generated by a diagnostic subunit secured to the rocket motor in question. In response, the rocket motor stages may be separated, as indicated at 102. Alternatively, the separation of stages 102 may be skipped. For each rocket motor, steps are then taken in response to the destruct signal.

Although three rocket motors are indicated in FIG. 9 by three generally parallel subsequences of events beginning at 104, 106, and 108, respectively, those of skill in the art will understand that the present invention is useful for shattering a launch vehicle having one or more solid fuel rocket motors. Also, vehicles having multiple rocket motors may include motors arranged either in parallel or as sequential stages.

During an igniting step indicated at 104, 106, and 108 for the respective motors, the previously unignited propellant of each rocket motor is ignited. Although the ignitions 104, 106, 108 are preferably substantially simultaneous, they may also be separated in time. Igniting causes the subsequent pressurization of the combustion chamber of each rocket motor by placing within the chamber combustion products of the ignited propellant.

However, pressurization of the combustion chamber is not accomplished immediately. A pressurization time $T_{pressurization}$ which depends on the particular rocket motor in question must elapse before a given pressurizing step 110, 112, 114 is complete. To allow adequate pressurization in a typical motor, this pressurization time $T_{pressurization}$ is in the range from about 100 milliseconds to about 1000 milliseconds, and is preferably in the range from about 200 milliseconds to about 400 milliseconds. The pressurization places the rocket motor propellant and the rocket motor case under tension, particularly if the case is formed of composites or similar materials.

Physical shattering of each rocket motor begins after sufficient pressurization as the explosive charge is exploded as indicated at 116, 188, and 120. The explosive charge is configured as described above to act in concert with the stresses created by combustion chamber pressurization to destroy the rocket motor by shattering it into many smaller pieces. Thus, the shattering step of the present method goes well beyond conventional steps that use explosives to merely pierce or make a cut in a rocket motor case. Even when they fracture the case, such conventional steps typically leave the propellant in one piece.

By contrast, the present method creates rocket motor case and propellant pieces that are substantially smaller than the original rocket motor. Each piece of the shattered motor has a weight that is preferably less than about one percent of the original weight (i.e., the combined weight of the original case and propellant immediately prior to the igniting step). The weight of each piece is most preferably less than about 0.1 percent of the original weight. Those of skill in the art will appreciate, however, that the art would be advanced even if the rocket motor were shattered into pieces that individually weigh up to about ten percent of the original weight.

Although conventional approaches take precautions against the ignition of upper stages during self-destruction, the advantages of igniting as many stages as possible are important benefits of the present invention. Initially, the ignited motors pressurize the combustion chamber, which assists the explosive charge in shattering the rocket motor as described herein. In addition, igniting the fuel tends to decrease the propellant debris even after the explosion, because ignited solid fuel typically continues burning even if it does not form part of a combustion chamber. Thus, the propellant debris may burn and hence becomes smaller even as it falls. Moreover, smaller pieces of debris have a greater aerodynamic drag-to-mass ratio and thus do not generally travel as far along the original ballistic trajectory as larger pieces.

In summary, the present invention provides a system and method for shattering a solid fuel rocket motor into many smaller pieces by subjecting the rocket motor case and propellant to the combined forces of motor pressurization and charge explosion. The rocket motor is first stressed from inside by pressurization of the combustion chamber. The rocket motor case is then subjected to explosive forces from at least one explosive charge. As a result, the motor shatters into many smaller pieces, thereby greatly reducing the risk to populated areas. The forces acting on the motor, and those created by the flying pieces of the shattered motor, also tend to break the entire launch vehicle into smaller pieces.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system for shattering a launch vehicle, the launch vehicle including a controller capable of generating a destruct signal, the launch vehicle also including at least one unignited solid fuel rocket motor, each solid fuel rocket motor including (a) a solid fuel propellant disposed about a combustion chamber within a rocket motor case, (b) a motor initiator capable of igniting the propellant during flight of the launch vehicle, and (c) at least one explosive charge positioned adjacent the rocket motor case, said system comprising:

a firing unit capable of receiving the destruct signal and of generating in response thereto a motor ignition signal and a charge explosion signal;

a motor ignition signal propagator having a motor ignition signal input and a motor ignition signal output, said motor ignition signal input being connected in signal communication with said firing unit for receiving said motor ignition signal, said motor ignition signal propagator being capable of propagation of said motor ignition signal such that said motor ignition signal arrives at said motor ignition signal output a motor ignition signal propagation time after the destruct signal reaches said firing unit, said motor ignition signal output being configured to cause ignition of the previously unignited solid fuel rocket motor in response to the arrival of said motor ignition signal; and a charge explosion signal propagator having a charge explosion signal input and a charge explosion signal output, said charge explosion signal input being connected in signal communication with said firing unit for receiving said charge explosion signal, said charge explosion signal propagator being capable of propagation of said charge explosion signal such that said charge explosion signal arrives at said charge explosion signal output a charge explosion signal propagation time after the destruct signal reaches said firing unit, said charge explosion signal output being configured to cause actuation of the explosive charge in response to the arrival of said charge explosion signal, said charge explosion signal propagation time being greater than said motor ignition signal propagation time by a pressurization time, said pressurization time being sufficient to allow ignition of the propellant and consequent pressurization of the combustion chamber in response to said motor ignition signal before actuation of the explosive charge in response to said charge explosion signal.

2. The system of claim 1, wherein the destruct signal includes an electronic destruct signal, said charge explosion signal comprises a pyrotechnic charge explosion signal, and said motor ignition signal comprises a pyrotechnic motor ignition signal.

3. The system of claim 1, wherein said firing unit is configured to generate said charge explosion signal at substantially the same time as said firing unit generates said motor ignition signal.

4. The system of claim 1, wherein said charge explosion signal propagator comprises an ordnance delay which is in signal communication with said charge explosion signal input and with said charge explosion signal output.

5. The system of claim 1, wherein said charge explosion signal propagator comprises an electronic delay which is in signal communication with said charge explosion signal input and with said charge explosion signal output.

6. The system of claim 1, wherein said motor ignition signal comprises an electronic motor ignition signal, said charge explosion signal comprises an electronic charge explosion signal, said motor ignition signal propagator comprises an ignition wire, and said charge explosion signal propagator comprises an explosion wire.

7. The system of claim 1, wherein said motor ignition signal comprises a pyrotechnic motor ignition signal, said charge explosion signal comprises a pyrotechnic charge explosion signal, said motor ignition signal propagator comprises a pyrotechnic ignition line, and said charge explosion signal propagator comprises a pyrotechnic explosion line.

8. The system of claim 1, wherein said pressurization time is in the range from about 100 milliseconds to about 1000 milliseconds.

9. The system of claim 1, wherein said pressurization time is in the range from about 200 milliseconds to about 400 milliseconds.

10. The system of claim 1, wherein said motor ignition signal output is configured in signal communication with the motor initiator to cause ignition of the previously unignited solid fuel rocket motor by actuating the motor initiator in response to the arrival of said motor ignition signal.

11. The system of claim 1, wherein the motor initiator of each rocket motor is a normal motor initiator configured to initiate ignition of the propellant during normal flight of the launch vehicle along a desired flight path, and said system further comprises a destruction motor initiator secured to each rocket motor in signal communication with said motor ignition signal output, and said destruction motor initiator is configured to initiate ignition of the propellant in response to said motor ignition signal if the launch vehicle strays substantially from the desired flight path and the destruct signal is received by said firing unit.

12. The system of claim 11, wherein said destruction motor initiator comprises a through-bulkhead-initiator which is capable of initiating ignition of the propellant.

13. A system for shattering a launch vehicle, the launch vehicle including a controller capable of generating a destruct signal, the launch vehicle also including at least one unignited solid fuel rocket motor, each solid fuel rocket motor including (a) a solid fuel propellant disposed about a combustion chamber within a rocket motor case, and (b) a motor initiator capable of igniting the propellant during flight of the launch vehicle, said system comprising:

at least one explosive charge positioned adjacent the rocket motor case;

a firing unit capable of receiving the destruct signal and of generating in response thereto an electronic motor ignition signal and an electronic charge explosion signal;

a motor ignition signal propagator comprising an ignition wire and having a motor ignition signal input and a motor ignition signal output, said motor ignition signal input being connected in signal communication with said firing unit for receiving said motor ignition signal, said motor ignition signal propagator being capable of propagation of said motor ignition signal such that said motor ignition signal arrives at said motor ignition signal output a motor ignition signal propagation time after the destruct signal reaches said firing unit, said motor ignition signal output being configured to cause ignition of the previously unignited solid fuel rocket motor in response to the arrival of said motor ignition signal; and a charge explosion signal propagator comprising an explosion wire connected to an electronic delay unit, said charge explosion signal propagator having a charge explosion signal input and a charge explosion signal output, said charge explosion signal input being connected in signal communication with said firing unit for receiving said charge explosion signal, said charge explosion signal propagator being capable of propagation of said charge explosion signal such that said charge explosion signal arrives at said charge explosion signal output a charge explosion signal propagation time after the destruct signal reaches said firing unit, said charge explosion signal output being configured to cause actuation of the explosive charge in response to the arrival of said charge explosion signal, said charge explosion signal propagation time being greater than said motor ignition signal propagation time by a pressurization time, said pressurization time being sufficient to allow ignition of the propellant and consequent pressurization of the combustion chamber in response to said motor ignition signal before actuation of the explosive charge in response to said charge explosion signal.

14. The system of claim 13, wherein said pressurization time is in the range from about 100 milliseconds to about 1000 milliseconds.

15. The system of claim 13, wherein said pressurization time is in the range from about 200 milliseconds to about 400 milliseconds.

16. The system of claim 13, wherein the motor initiator of each rocket motor is a normal motor initiator configured to initiate ignition of the propellant during normal flight of the launch vehicle along a desired flight path, and said system further comprises a destruction motor initiator secured to each rocket motor in signal communication with said motor ignition signal output, and said destruction motor initiator is configured to initiate ignition of the propellant in response to said motor ignition signal if the launch vehicle strays substantially from the desired flight path and the destruct signal is received by said firing unit.

17. The system of claim 16, wherein said destruction motor initiator comprises at least two through-bulkhead-initiators which are individually capable of initiating ignition of the propellant.

18. A method for destroying a launch vehicle, the launch vehicle including at least one unignited solid fuel rocket motor, each rocket motor including a solid fuel propellant disposed about a combustion chamber within a rocket motor case, each rocket motor also including at least one explosive charge positioned adjacent the rocket motor case, said method comprising the steps of:

igniting the previously unignited propellant of the rocket motor during flight;

pressurizing the combustion chamber of the rocket motor by placing within the chamber combustion products of the ignited propellant; and shattering the rocket motor case and the propellant by exploding the explosive charge, said shattering step occurring a sufficient time after said igniting step that the combined forces on the rocket motor created by exploding the explosive charge and by said pressurizing step destroy the rocket motor by shattering the rocket motor into pieces such that each piece has a weight that is substantially smaller than the weight of the rocket motor immediately prior to said igniting step, wherein the motor initiator of each rocket motor is a normal motor initiator and each rocket motor further includes a destruction motor initiator, the normal motor initiator is configured to initiate ignition of the propellant during normal flight of the launch vehicle along a desired flight path, the destruction motor initiator is configured to initiate ignition of the propellant if the launch vehicle strays substantially from the desired flight path, and said igniting step comprises igniting the previously unignited propellant of the rocket motor with the destruction motor initiator.

19. A method for destroying a launch vehicle, the launch vehicle including at least one unignited solid fuel rocket motor, each rocket motor including a solid fuel propellant disposed about a combustion chamber within a .rocket motor case, each rocket motor also including at least one explosive charge positioned adjacent the rocket motor case, said method comprising the steps of:

igniting the previously unignited propellant of the rocket motor during flight;

pressurizing the combustion chamber of the rocket motor by placing within the chamber combustion products of the ignited propellant; and shattering the rocket motor case and the propellant by exploding the explosive charge, said shattering step occurring a sufficient time after said igniting step that the combined forces on the rocket motor created by exploding the explosive charge and by said pressurizing step destroy the rocket motor by shattering the rocket motor into pieces such that each piece has a weight that is substantially smaller than the weight of the rocket motor immediately prior to said igniting step, wherein said shattering step begins at a time between about 100 milliseconds and about 1000 milliseconds after the time at which said igniting step begins.

20. A method for destroying a launch vehicle, the launch vehicle including at least one unignited solid fuel rocket motor, each rocket motor including a solid fuel propellant disposed about a combustion chamber within a rocket motor case, each rocket motor also including at least one explosive charge positioned adjacent the rocket motor case, said method comprising the steps of:

igniting the previously unignited propellant of the rocket motor during flight;

pressurizing the combustion chamber of the rocket motor by placing within the chamber combustion products of the ignited propellant; and shattering the rocket motor case and the propellant by exploding the explosive charge, said shattering step occurring a sufficient time after said igniting step that the combined forces on the rocket motor created by exploding the explosive charge and by said pressurizing step destroy the rocket motor by shattering the rocket motor into pieces such that each piece has a weight that is substantially smaller than the weight of the rocket motor immediately prior to said igniting step, wherein said shattering step begins at a time between about 200 milliseconds and about 400 milliseconds after the time at which said igniting step begins.

21. A method for destroying a launch vehicle, the launch vehicle including at least one unignited solid fuel rocket motor, each rocket motor including a solid fuel propellant disposed about a combustion chamber within a rocket motor case, each rocket motor also including at least one explosive charge positioned adjacent the rocket motor case, said method comprising the steps of:

igniting the previously Unignited propellant of the rocket motor during flight;

pressurizing the combustion chamber of the rocket motor by placing within the chamber combustion products of the ignited propellant; and shattering the rocket motor case and the propellant by exploding the explosive charge, said shattering step occurring a sufficient time after said igniting step that the combined forces on the rocket motor created by exploding the explosive charge and by said pressurizing step destroy the rocket motor by shattering the rocket motor into pieces such that each piece has a weight that is substantially smaller than the weight of the rocket motor immediately prior to said igniting step, wherein said shattering step comprises destroying the rocket motor by shattering it into pieces such that each piece has a weight less than about ten percent of the original weight of the rocket motor.

22. A method for destroying a launch vehicle, the launch vehicle including at least one unignited solid fuel rocket motor, each rocket motor including a solid fuel propellant disposed about a combustion chamber within a rocket motor case, each rocket motor also including at least one explosive charge positioned adjacent the rocket motor case, said method comprising the steps of:

igniting the previously unignited propellant of the rocket motor during flight;

pressurizing the combustion chamber of the rocket motor by placing within the chamber combustion products of the ignited propellant; and shattering the rocket motor case and the propellant by exploding the explosive charge, said shattering step occurring a sufficient time after said igniting step that the combined forces on the rocket motor created by exploding the explosive charge and by said pressurizing step destroy the rocket motor by shattering the rocket motor into pieces such that each piece has a weight that is substantially smaller than the weight of the rocket motor immediately prior to said igniting step, wherein said shattering step comprises destroying the rocket motor by shattering it into pieces such that each piece has a weight less than about one percent of the original weight of the rocket motor.

23. A method for destroying a launch vehicle, the launch vehicle including at least one unignited solid fuel rocket motor, each rocket motor including a solid fuel propellant disposed about a combustion chamber within a rocket motor case, each rocket motor also including at least one explosive charge positioned adjacent the rocket motor case, said method comprising the steps of:

igniting the previously unignited propellant of the rocket motor during flight;

pressurizing the combustion chamber of the rocket motor by placing within the chamber combustion products of the ignited propellant; and shattering the rocket motor case and the propellant by exploding the explosive charge, said shattering step occurring a sufficient time after said igniting step that the combined forces on the rocket motor created by exploding the explosive charge and by said pressurizing step destroy the rocket motor by shattering the rocket motor into pieces such that each piece has a weight that is substantially smaller than the weight of the rocket motor immediately prior to said igniting step, wherein said shattering step comprises destroying the rocket motor by shattering it into pieces such that each piece has a weight less than about 0.1 percent of the original weight of the rocket motor.

* * * * *